Dec. 25, 1951        H. SCHAEVITZ        2,579,617
THRUST METER
Filed Feb. 7, 1950
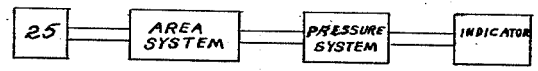
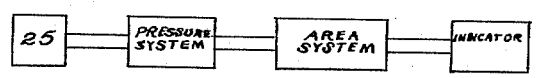
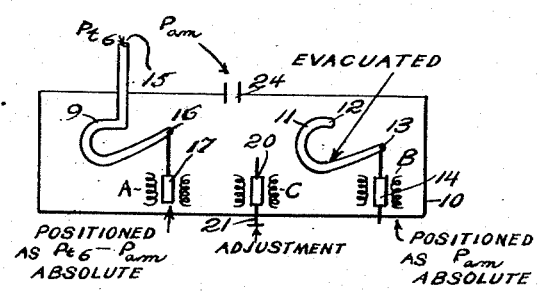
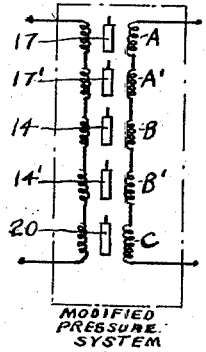
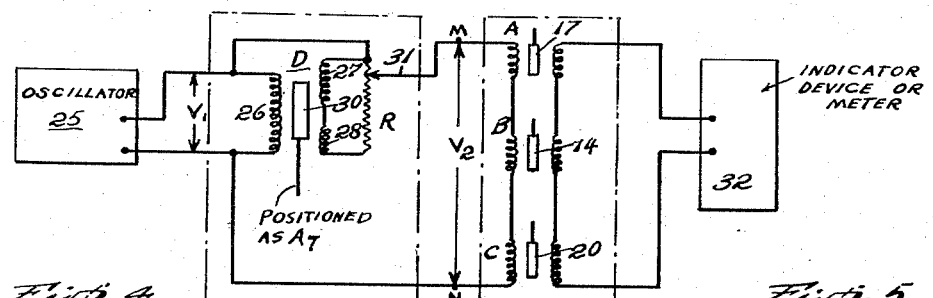
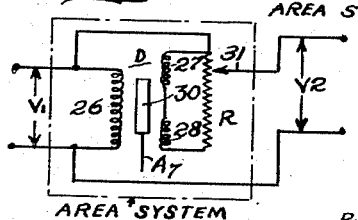
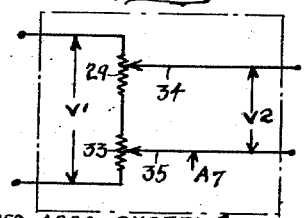
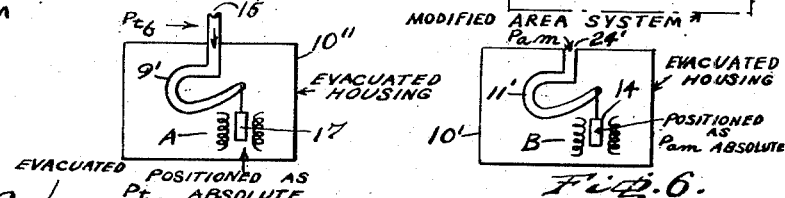
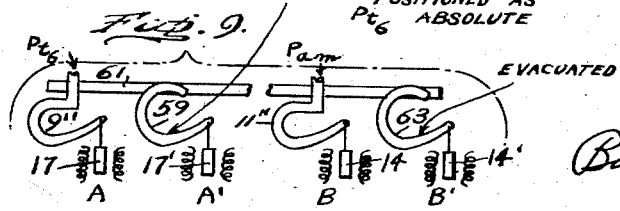
INVENTOR
HERMAN SCHAEVITZ.
BY
ATTORNEYS.

Patented Dec. 25, 1951

2,579,617

UNITED STATES PATENT OFFICE 2,579,617

THRUST METER

Herman Schaevitz, Collingswood, N. J.

Application February 7, 1950, Serial No. 142,912

11 Claims. (Cl. 73—116)

This invention relates to thrust meters, and particularly to devices for continuously measuring and indicating the thrust of reaction engines, such as jets, ram jets, turbojets, rockets, guided missiles and the like.

There is a great need for an accurate measurer and indicator for the thrust of reaction motor devices, because so far as known there have not yet been created any devices capable of accurately indicating, measuring and/or recording the actual gross or net thrust developed by such motors in take off or in flight. The provision of a small accurate and highly official but relatively inexpensive thrust meter is the primary object of the invention. An additional important object is to provide a thrust meter effecting an electrical signal of thrust in accordance with a given formula and derivations from the formula.

Previous efforts to measure the thrust developed by reaction motors have been complicated by the necessity for mounting the reaction motor rigidly in the body or craft with which it is associated, and suspending the body or craft in space during the test runs of the reaction motors. This has been difficult to perform because of the masses and displacements involved, and when accomplished has been a mere approximation due to the variables and errors which inevitably creep into the calculations. Moreover, this has not sufficed to furnish a continuous reading of actually developed thrust when the craft is in take off or in flight.

Part of the difficulties of past efforts to evolve thrust meters by which the pilot, or an instrument such as a telemetering device in lieu of the pilot, could be constantly advised of the actual thrust produced by each respective reaction engine, has been because of difficulty in the production of true and proper formulae for measuring the thrust. There are now several of such formulae being considered by the various parties and governmental agencies concerned with reaction motors, and it is difficult at this moment to know which is most accurate, and which therefore is the ultimate best of the several formulae. However, one formula which has attained considerable scientific backing and may well be the ultimate foundation for the true and proper thrust determination can be expressed as follows:

$$F = A_7 k p_{t_6} \sqrt{\frac{2}{k-1}\left(\frac{2}{k+1}\right)^{\frac{k+1}{k-1}}\left[1 - \frac{p_{am}}{p_{t_6}}^{\frac{k-1}{k}}\right]}$$

assuming $k=1.335$ in which "F" represents thrust in pounds; "$A_7$" represents nozzle exit area in square feet, hereinafter identified as "tail area"; "$p_{t_6}$" represents nozzle inlet total pressure in #/ft.² absolute; and "$p_{am}$" represents static ambient pressure in #/ft.² absolute. $k$ is the ratio of specific heats of the products of combustion. A good average value for $k$ in the normal temperature range of operation is the value 1.335 used above. This reduces to (1) $$F = 1.905 A_7 p_{t_6}\left[1 - \left(\frac{p_{am}}{p_{t_6}}\right)^{.2509}\right]^{\frac{1}{2}}$$

Because of the present difficulty of translating this formula directly into a mechanical and electrical organization, and in view of the fact that the useful range of measurement is for values of the ratio $p_{am}/p_{t_6}$ between the limits 0.3 and 0.6, Formula 1 may be approximated with negligible error by:

(2) $$F = K A_7 [(p_{t_6} - C_1 p_{am})]$$

in which K and $C_1$ are constants.

Formula 2 can also be expressed as follows:

(3) $$F = K A_7 [(p_{t_6} - p_{am}) + C_2 p_{am}]$$

in which $C_2 = 1 - C_1$.

The usefulness of this invention is not necessarily dependent upon the correctness of Formula 1 nor is it necessarily limited to the measurement of thrust. The invention applies equally well to any formula or empirical relationship which can be expressed exactly or with reasonable approximation in the same mathematical form as Formula 2 or Formula 3, with $A_7$, $p_{t_6}$ and $p_{am}$ each representing any physical quantity which can be simulated or represented by an electrical oscillatory voltage having a magnitude linearly related to that of the quantity itself. In the description which follows, however, it is assumed that the invention is to be used for the measurement of thrust.

The invention consists essentially of the following portions:

(a) An oscillator or generator supplying an alternating voltage of constant amplitude and frequency.

(b) A device referred to herein as the "area system," to which is applied an oscillatory input voltage and a mechanical motion or rotation indicative of $A_7$, and which produces at its output terminals an oscillatory voltage proportional in amplitude to $A_7$ and to the amplitude of the applied input voltage.

(c) A device, referred to herein as the "pressure system," to which is applied an oscillatory input voltage, pressure $p_{t_6}$, pressure $p_{am}$, and vacuum, and which produces at its output terminals an oscillatory voltage proportional in amplitude to $(p_{t_6} - C_1 p_{am})$ and to the amplitude of the applied input voltage.

(d) A recording, indicating, or signaling device or meter to which is applied an oscillatory input voltage and which records or indicates the amplitude of the applied input voltage.

In the accompanying drawings forming part of this description:

Fig. 1 represents by block diagram an illustrative series of devices and mechanisms forming one exemplification of the invention.

Fig. 2 represents by block diagram a modified illustrative series of devices and mechanisms forming a modified exemplification of the invention.

Fig. 3 represents a schematic assembly of a form of transducer assembly comprising the pressure system showing pressure responsive Bourdon tubes for furnishing an output for the circuit.

Fig. 4 represents a schematic wiring diagram of an illustrative form of area system for providing an output for the circuit.

Fig. 5 represents a schematic wiring diagram of a modified form of area system for providing an output for the circuit.

Figs. 6 and 7 represent schematic assemblies of modified forms of transducer assemblies, utilizing pressure-responsive Bourdon tubes for furnishing outputs for the circuit.

Fig. 8 represents a wiring diagram of an illustrative circuit combining the various functions of the area and pressure systems to secure the desired indication, as of thrust, in or by an indicator in the circuit.

Figs. 9 and 10 represent schematic diagrams of a preferred embodiment of pressure system.

Referring now to the block diagram of Fig. 1, an illustrative circuit is disclosed by which the portions of the invention defined above can be integrated to give an indication and measurement of thrust of the associated reaction motor. The output of oscillator 25 is applied as the input to the area system. The output of the area system is applied as the input to the pressure system. The output of the pressure system is applied as the input to the meter or indicator. Alternatively, the area system and the pressure system may be interchanged, as shown in Fig. 2.

The oscillator or generator 25 may be any one of many well-known types; illustratively, it may be an aircraft generator furnishing electrical power not only to this invention but to other electrical equipment as well, and the output of the generator may be applied to the other portions of this invention either directly or through a transformer which converts the voltage to a suitable amplitude.

The area system is composed, illustratively, of the arrangement shown in Fig. 4.

The area system comprises any suitable device capable of providing an output modified in response to, and either as a linear or non-linear function of, movement of the nozzle exit area of the reaction motor, which for convenience, as noted, is designated as "tail area." In the preferred embodiment, the response of the movement is linear, i. e., the voltage amplitude increases proportionately to the movement of the movable element. The area system disclosed in Fig. 4 comprises a differential or like transformer D, the primary 26 of which, in Fig. 1, is energized by a voltage $V_1$ from the oscillator 25. In the system according to Fig. 2, the primary 26 is energized by the output of the pressure system, to be described. The secondaries 27 and 28 of transformer D are in series with voltage divider R having the adjustable arm 31 furnishing one lead for the output terminals of the area system. The other lead is directly from the input, so that a voltage $V_2$ appears across the terminals of the area system, modified by the setting of the voltage divider and also and primarily varied as the armature 30 moves in response to variations in tail area. It will be seen that the output of the area system of Fig. 4 is proportional to applied voltage and to $A_7$.

As the tail area response may well be a movement of appreciable magnitude, a modified form of area system may be used. Thus, referring to Fig. 5, the input $V_1$ may be to two series connected potentiometers 29 and 33. The arm 34 of potentiometer 29 may be adjusted preliminarily for balance and to obviate errors, and form one leg of the output of the system. The arm 35 of potentiometer 33 may be coupled for response as functions of variations of tail area $A_7$, and form the other leg of the output of the area system. The voltage $V_2$ between the arms 34 and 35 comprises the adjusted signal from the area system. It will also be understood that although it is generally preferred that the variation in output of either form of area system be linear, i. e. changing in magnitude proportionally to the movement of the element responsive to $A_7$, if desired this response can be made predeterminedly non-linear, as will be clear.

In any case, it will be understood that the output of the area system is proportioned to the applied voltage and to $A_7$. In Fig. 1 the area system is directly actuated by the oscillator 25 and forms the input to the pressure system, to be described. In Fig. 2, the output of the pressure system forms the input voltage to the area system and the output of the latter furnishes the signal voltage for the indicator, to be described.

Referring to the schematic diagram of Fig. 3, a purely illustrative assembly of units composing the pressure system is disclosed. In this illustrative case, a housing 10 is provided in which some or all of the elements are incorporated, including two pressure-responsive devices.

These may be of any type, such as bellows, diaphragms, or the like. It is preferred, however, in the illustrative case to use Bourdon tubes. The housing 10 has an aperture 24 permitting access of static ambient air to the interior of the housing. A measurement of $p_{am}$ in absolute terms is secured, illustratively, by means of a Bourdon tube 11, having an anchored end 12 secured on a wall of the housing 10, the free end 13 of which carries an armature or core piece 14 movable between a primary and a secondary coil of the two-coil variable mutual inductance B. This Bourdon tube 11 is evacuated and sealed, while externally it is exposed to the static ambient pressure outside of the housing 10 by means of the aperture 24 therein. A measurement of $p_{t_6} - p_{am}$ in absolute terms is secured, illustratively, by a second Bourdon tube 9, anchored in a wall of the housing 10 with its inlet end 15 in communication with an intake in the nozzle inlet of the reaction motor (not shown) while externally it is exposed to the static ambient pressure outside of the housing 10 by means of the aperture 24 therein. The free end 16 of Bourdon tube 9 carries a core or armature 17 movable between the primary and secondary of two-coil variable mutual inductance A. The housing or other suitable mounting also contains or mounts an adjustable core or armature 20, adjustable from the outside of the housing, between the primary and secondary of a two-coil variable mutual inductance C, by a screw or like adjustment 21. Transformer C, with core 20 and adjustment 21, need not be located in enclosure 10, but may be in any convenient location.

The characteristics of each of the variable mutual inductances A and B are such that the voltage induced in the secondary of each is directly proportional to the voltage applied to the primary of the same inductance and is also a linear function of the displacement of the core 17 or 14 of the same inductance. The characteristics of each of the Bourdon tubes 11 and 9 are such that the displacement of the free end 16 or 13 is a linear function of the differences between the internal and external pressures applied to the same Bourdon tube. Thus, the electrical output of the secondary of inductance A is directly proportional to the voltage applied to its primary and is also a linear function of $pt_6 - p_{am}$ expressed in absolute terms. Similarly, the electrical output of the secondary of inductance B is directly proportional to the voltage applied to its primary and is also a linear function of $p_{am}$ expressed in absolute terms.

Inductances A and B connected in series produce an output of the form $$K_1(pt_6 - p_{am}) + K_2 p_{am} + K_3$$

The number of turns is adjusted so that $$\frac{K_2}{K_1} = C_2$$

Inductance C is adjusted to give an output $-K_3$. The combined output is then $$K_1[(pt_6 - p_{am}) + C_2 p_{am}]$$

which is the same as pressure portion of (3) except for the constant multiplier. Conceivably, $K_3$ may be required for some application, so the output of inductance C need not be equal to $-K_3$ in all cases.

Alternatively, if it is desired to simulate Formula 2 rather than Formula 3, a modification of Fig. 3 may be resorted to by which the respective Bourdon tubes are in separate boxes, as shown respectively in Figs. 6 and 7. Referring to Fig. 6, the Bourdon tube 11' is mounted in a box 10' which is evacuated and sealed, so that a vacuum is incident on the outer wall of the pressure element 11', while the mouth 24' of the tube is exposed to ambient static pressure. The tube 11' is internally exposed to static ambient pressure in place of being internally evacuated. In this case, therefore, the output of the secondary of the inductance B is a linear function of $p_{am}$ absolute. Similarly, in Fig. 7, the Bourdon tube 9' is mounted in a box 10'' and the mouth or entrance 15 of the tube is connected to the nozzle inlet pressure of the reaction motor, while the interior of box 10'' is evacuated, so that the outer wall of tube 9' is exposed to vacuum conditions while the interior is under the inlet nozzle pressures, so that the output of the inductance A is a linear function of $pt_6$ absolute as a separate value independent of $p_{am}$.

It will be clear that other modifications can be resorted to within the scope of the invention. Thus, the tubes 11' and 9' respectively may both be evacuated and sealed and disposed in the respective separate boxes 10' and 10''. The latter may respectively be internally coupled to $p_{am}$ and $pt_6$ and respond in absolute pressure terms, as will be understood.

Assuming the circuit arrangements of Fig. 8, following the block diagram of Fig. 1, the oscillator input is to the area system, the output of which is proportional to the applied voltage and to the value of $A_7$ and is fed to the pressure system, and then to the indicator 32, producing an output indication:

$$K_4 A_7 [(pt_6 - p_{am}) + C_2 p_{am}]$$

or $$K_4 A_7 (pt_6 - C_1 p_{am})$$

Since this differs from (2) or (3) only in constant, direct indication is obtained by proper calibration of the indicator.

While the pressure system heretofore described is highly effective and in many cases may be preferred, it will be seen that it may not be immune to certain of the accelerations to which it may be subjected. It also requires the provision of boxes and like structures that may be undesirable. I prefer to use a modification of the assembly in the pressure system which requires no boxes so that the equipment may be mounted wherever desired, while being completely immune to all accelerations. This modification is illustrated in Figs. 9 and 10.

In this assembly I provide four pressure devices, arranged in two pairs. The illustrative pressure devices are Bourdon tubes, and the tube 9'' is provided, the inlet of which is connected to the nozzle inlet pressure of the reaction motor, as has been described of tube 9 of Fig. 3, and it controls by armature 17 the output of the variable inductance A. Associated with tube 9'' is a second, complemental or auxiliary tube 59, which is evacuated and sealed, and is mounted in the same angular relation as tube 9'', as on a mounting panel 61, so that both tubes are arranged for identical response to all accelerations to which they may be subjected. Tube 59 in its responses to surrounding ambient pressures actuates the armature 17' of the variable mutual inductance A', and the output thereof from its secondary is wired in opposition to the output of the secondary of inductance A. As the difference between gauge and absolute pressure is thus electrically neutralized, the net or resultant reading of inductance A is in terms of $pt_6$ absolute. Similarly, tube 11'' is mounted suitably on the craft with its interior exposed to static ambient pressure through its inlet, and, by armature 14 controls the output of the inductance B as before. A second auxiliary or supplementary tube 63 is provided, evacuated and sealed, and mounted in the same angular position as tube 11'', as on the same panel 61, or another independent mounting board, so as to have identical acceleration response as tube 11'. The output of the secondary of inductance B' controlled by armature 14' is coupled in opposition to the output of the secondary of inductance B so that the net or resultant reading of output of transformer B is in terms of $p_{am}$ absolute. It will be seen that with both pairs of tubes, any errors in readings from the inductances A or B respectively due to movement of the armatures by reason of acceleration is electrically neutralized by the changed output of the complemental inductances A' and B' respectively, so that in either case the readings are constant in accordance with the instantaneous values of the variables affecting the tubes 9″ and 11″ in absolute terms.

It will be understood, however, that the disclosure thus described as presently preferable, may be modified within wide limits both in the agencies used for response to the variables, as well as in the electrical organization. For instance, it will be clear that a wide range of transpositions of the formulae may be resorted to, as well as in the electrical organization. Thus, the indicator 32 may be direct reading or of the null balance type. It may be a "D'Arsonval" meter. The transducers A, B, C, or D may be of 1, 2, 3, 4, or more coils.

It will be apparent that according to the formulae and to the electrical circuit for deriving the thrust of the reaction motor, the resultant signal is of gross thrust.

Having thus described my invention, I claim:

1. A thrust meter for a reaction motor comprising means defining an electrical circuit having an input from a source of oscillatory voltage and an output as an electrical value, said circuit comprising a voltage regulator, a variable voltage divider, means operated as a function of instantaneous tail area setting of such reaction motor for actuating the voltage regulator to control the voltage across the voltage divider, said circuit including the primaries of a plurality of mutual inductances in series from one side of the input through the arm of the voltage divider and the voltage divider to the other side of said input, the secondaries of said plurality of mutual inductances being in series to form the output, and means respectively operated by the nozzle inlet pressure and the static ambient pressure for controlling and varying the respective mutual inductances of said plurality to provide in the output a signal indicative of the thrust.

2. A thrust meter for measuring thrust of a reaction motor according to the formula $$F = KA_7[(p_{t_6} - C_1 p_{am}) + K_1]$$

in which F represents thrust, $A_7$ represents tail area of the reaction motor in square feet, $p_{t_6}$ represents nozzle inlet total pressure, and $p_{am}$ represents static ambient pressure, and wherein K, $C_1$, and $K_1$ are constants, the system which comprises an electrical circuit having an input for oscillatory voltage, a voltage divider having a movable arm and disposed in the circuit, a voltage regulator in series with the voltage divider and varied in accordance with $A_7$, two variable mutual inductances, means coupling the primaries of two mutual inductances in series through the arm of the voltage divider and the resistance thereof with both sides of the input from the voltage, a signal device, the secondaries of the mutual inductances and said signal device being in series in the circuit, and movable core elements operatively associated with the said mutual inductances and respectively positioned as a function of $p_{t_6}$ and $p_{am}$ to vary and control the voltage applied to the signal device.

3. A thrust meter for measuring thrust of a reaction motor according to the formula $$F = KA_7[(p_{t_6} - C_1 p_{am}) + K_1]$$

in which F represents thrust, $A_7$ represents tail area of the reaction motor in square feet, $p_{t_6}$ represents nozzle inlet total pressure, and $p_{am}$ represents static ambient pressure, and wherein K, $C_1$, and $K_1$ are constants, the system which comprises an electrical circuit having an input for oscillatory voltage, a voltage divider having a movable arm and disposed in the circuit, a voltage regulator in series with the voltage divider and varied in accordance with $A_7$, two variable mutual inductances, means coupling the primaries of two mutual inductances in series through the arm of the voltage divider and the resistance thereof with both sides of the input from the voltage, a signal device, the secondaries of the mutual inductances and said signal device being in series in the circuit, and movable core elements operatively associated with the said mutual inductances and respectively positioned as a function of $p_{t_6}$ and $p_{am}$ to vary and control the voltage applied to the signal device, and a third adjustable mutual inductance in said circuit and arranged for adjustment to establish the value of $K_1$ through all values including zero.

4. A thrust meter for measuring thrust of a reaction motor as an electrical value according to the formula $F = KA_7[(p_{t_6} - p_{am}) + C_2 p_{am} + K_1]$ in which F represents thrust, $A_7$ represents nozzle exit area of such reaction motor in square feet, $p_{t_6}$ represents nozzle inlet total pressure of such reaction motor in pounds per square foot absolute, $p_{am}$ represents static ambient pressure in pounds per square foot absolute, and K, $C_2$ and $K_1$ represents constants, the system which comprises an electrical circuit having an input of oscillator voltage and an output of an electrical signal representative of F, a voltage divider having an adjustable arm, a voltage regulator in circuit with the voltage divider and varied in accordance with $A_7$, a plurality of variable mutual inductances each including a primary, a secondary and a movable core, a connection between the end of the voltage divider and one side of the input, a series connection from the adjustable arm of the voltage divider and the respective primaries of said plurality of inductances and to the other side of said input, means for adjusting the core of one of said inductances as a function of the value of $p_{t_6} - p_{am}$ to vary the output of the secondary thereof, means for adjusting the core of another of said inductances as a function of the value of $p_{am}$ to vary the output of a secondary thereof, and a signalling device in series with the respective secondaries of said mutual inductances furnishing an output representative of said value of F.

5. A thrust meter formed of an area system comprising a movable element voltage regulator, means for controlling the movable element of the regulator proportionally to variations in the settings of the nozzle exit area of an associated reaction motor, means for energizing said regulator with oscillatory voltage to furnish an output from the system proportional to said voltage and the settings of said regulator, a pressure system comprising a first inductance having a movable core element to vary the output of said inductance, a pressure-responsive element coupled to said movable core element for response to variations in the inlet nozzle pressure of such associated reaction motor to adjust said core element proportionally thereto, a second inductance having a second movable core element to vary the output of said second inductance, a second pressure-responsive element coupled to said second movable core element for response to static ambient pressure to adjust said second core proportionally thereto, each inductance comprising a primary and a secondary winding, means connecting the output of the area system with the primary windings of the said inductances in series, an indicator system, and means coupling the said secondary windings of said inductances in series with the indicator system whereby the controlled output of the area system furnishes the voltage for the pressure system and the adjustments of the respective core members modifies the voltage through the primaries to furnish an output indicative of thrust of such reaction motor.

6. A thrust meter formed of an area system comprising a movable element voltage regulator, means for controlling the movable element of the regulator proportionally to variations in the settings of the nozzle exit area of an associated reaction motor, means for energizing said regulator with oscillatory voltage to furnish an output from the system proportional to said voltage and the settings of said regulator, a pressure system comprising a first inductance having a movable core element to vary the output of said inductance, a pressure-responsive element coupled to said movable core element for response to variations in the inlet nozzle pressure of such associated reaction motor to adjust said core element proportionally thereto, a second inductance having a second movable core element to vary the output of said second inductance, a second pressure-responsive element coupled to said second movable core element for response to static ambient pressure to adjust said second core proportionally thereto, each inductance comprising a primary and a secondary winding, means connecting the output of the area system with the primary windings of the said inductances in series, an indicator system, and means coupling the said secondary windings of said inductances in series with the indicator system whereby the controlled output of the area system furnishes the voltage for the pressure system and the adjustments of the respective core members modifies the voltage through the primaries to furnish an output indicative of thrust of such reaction motor, a third inductance having a third movable core member and comprising a primary and a secondary winding, said primary winding of the third inductance being in series with the primary winding of the other said inductances, said secondary winding of the third inductance being in series with the secondary windings of the other inductances, and means for adjusting the core of said third inductance.

7. A thrust meter formed of a pressure system comprising at least two variable mutual inductances each having primary and secondary windings and a movable core element to vary the output of the respective inductances, means connecting the primaries of the said inductances in series with a source of oscillatory voltage, a pressure-responsive element coupled to the movable core element of one inductance for response to variations in inlet nozzle pressure of an associated reaction motor to adjust said core proportionally thereto, a second pressure-responsive element coupled to the movable core element of another of said inductances for response to static ambient pressure to adjust said core proportionally thereto, an area system comprising a movable element voltage regulator, means for controlling the movable element of the regulator proportionally to the settings of the nozzle exit area of such associated reaction motor, an input circuit for the area system formed of the secondaries of said inductances in series, and an indicator to which the area system is connected to effect an electrical indication of the thrust of the associated reaction motor as a function of the voltage output from said area system.

8. In thrust meters and the like, a pressure system comprising a pressure-responsive element arranged for coupling to the inlet nozzle pressure of an associated reaction motor, a variable mutual inductance, a core of magnetic material attached to the element to control the output of the secondary of said inductance proportionally to the gauge pressure effective in said element, a complemental pressure-responsive element mounted in a position physically similar to that of the first element so that they are identically responsive to accelerations, a second variable mutual inductance, a second core of magnetic material connected to the second element to control the output of the secondary of said second inductance proportionally to the movement of said second element, said second element being evacuated and sealed and therefore being responsive to static ambient pressures in absolute terms, said respective secondaries of said respective inductances being coupled in opposition so that the net output of the two secondaries is in terms of inlet nozzle pressure absolute, and whereby errors due to accelerations changing the output of one inductance are cancelled out by the corresponding change of output of the other inductance.

9. In thrust meters and the like, a pressure system comprising a pressure-responsive element arranged for coupling to the inlet nozzle pressure of an associated reaction motor, a variable mutual inductance, a core of magnetic material attached to the element to control the output of the secondary of said mutual inductance proportionally to the gauge pressure effective in said element, a complemental pressure-responsive element mounted in a position physically similar to that of the first element so that they are identically responsive to accelerations, a second variable mutual inductance, a second core of magnetic material connected to the second element to control the output of the secondary of said second inductance proportionally to the movement of said second element, said second element being evacuated and sealed and therefore being responsive to static ambient pressures in absolute terms, said respective secondaries of said respective mutual inductances being coupled in opposition so that the net output of the two secondaries is in terms of inlet nozzle pressure absolute, whereby errors due to accelerations changing the output of one mutual inductance are cancelled out by the corresponding change of output of the other mutual inductance, said pressure system comprising a third pressure-responsive element, responsive to static ambient pressures in gauge terms, a third mutual inductance, a movable core for the third mutual inductance coupled to the third element to control the output of the third mutual inductance in accordance with variations in the static ambient pressures, a fourth pressure-responsive element evacuated and sealed and mounted physically similarly to the third element so as to respond identically to accelerations, a fourth mutual inductance, a movable core for the fourth mutual inductance coupled to the fourth element, the outputs of the third and fourth mutual inductances being coupled in opposition whereby the net output is a function of static ambient pressures in absolute terms, said net output of the first and second mutual inductances and said net output of the third and fourth mutual inductances being in series to provide a signal functional to the absolute values of inlet nozzle pressure and static ambient pressure.

10. In thrust meters, a first pressure system comprising means for furnishing an electrical output proportional to the inlet nozzle pressure of an associated reaction motor in gauge terms, a first means for furnishing an opposing electrical output proportional to static ambient pressures in absolute terms, whereby a net output is secured proportional to inlet nozzle pressure in absolute terms, a second pressure system comprising means for furnishing an electrical output proportional to the static ambient pressure in gauge terms, second means for furnishing a cancelling electrical output proportional to static ambient pressure in absolute terms, whereby a net output is secured proportional to static ambient pressure in absolute terms, and means combining the respective net outputs to form a pressure system output proportional to a voltage applied to said voltage system and to the instantaneous values of inlet nozzle and static ambient pressures.

11. In thrust meters, a first pressure system comprising means for furnishing an electrical output proportional to the inlet nozzle pressure of an associated reaction motor in gauge terms, a first means for furnishing an opposing electrical output proportional to static ambient pressures in absolute terms, whereby a net output is secured proportional to inlet nozzle pressure in absolute terms, a second pressure system comprising means for furnishing an electrical output proportional to the static ambient pressure in gauge terms, second means for furnishing a cancelling electrical output proportional to static ambient pressure in absolute terms, whereby a net output is secured proportional to static ambient pressure in absolute terms, means combining the respective net outputs to form a pressure system output proportional to a voltage applied to the said first and second pressure systems and first and second means and to the instantaneous values of inlet nozzle and static ambient pressures, and means for combining the first pressure system and the first means for simultaneous and identical response to physical accelerations so that any change in output of the pressure system is neutralized by the corresponding change in the cancelling output of the means, and means combining the second pressure system and second means for simultaneous and identical response to physical accelerations so that any changes in output of the second pressure system is neutralized by the corresponding change in the cancelling output of the second means.

HERMAN SCHAEVITZ.

REFERENCES CITED

The following references are of record in the file of this patent:

UNITED STATES PATENTS

| Number | Name | Date |
|---|---|---|
| 1,768,553 | Freeman | July 1, 1930 |
| 2,045,970 | Stein | June 30, 1936 |
| 2,070,842 | Reichel et al. | Feb. 16, 1937 |
| 2,073,394 | MacMillan | Mar. 9, 1937 |
| 2,331,128 | MacNeil | Oct. 5, 1943 |
| 2,382,994 | Holden | Aug. 21, 1945 |
| 2,420,539 | Hornfeck | May 13, 1947 |
| 2,524,749 | Baldridge et al. | Oct. 10, 1950 |